May 27, 1924.
C. G. CLINE
CONTAINER
Filed Aug. 1, 1922
1,495,548
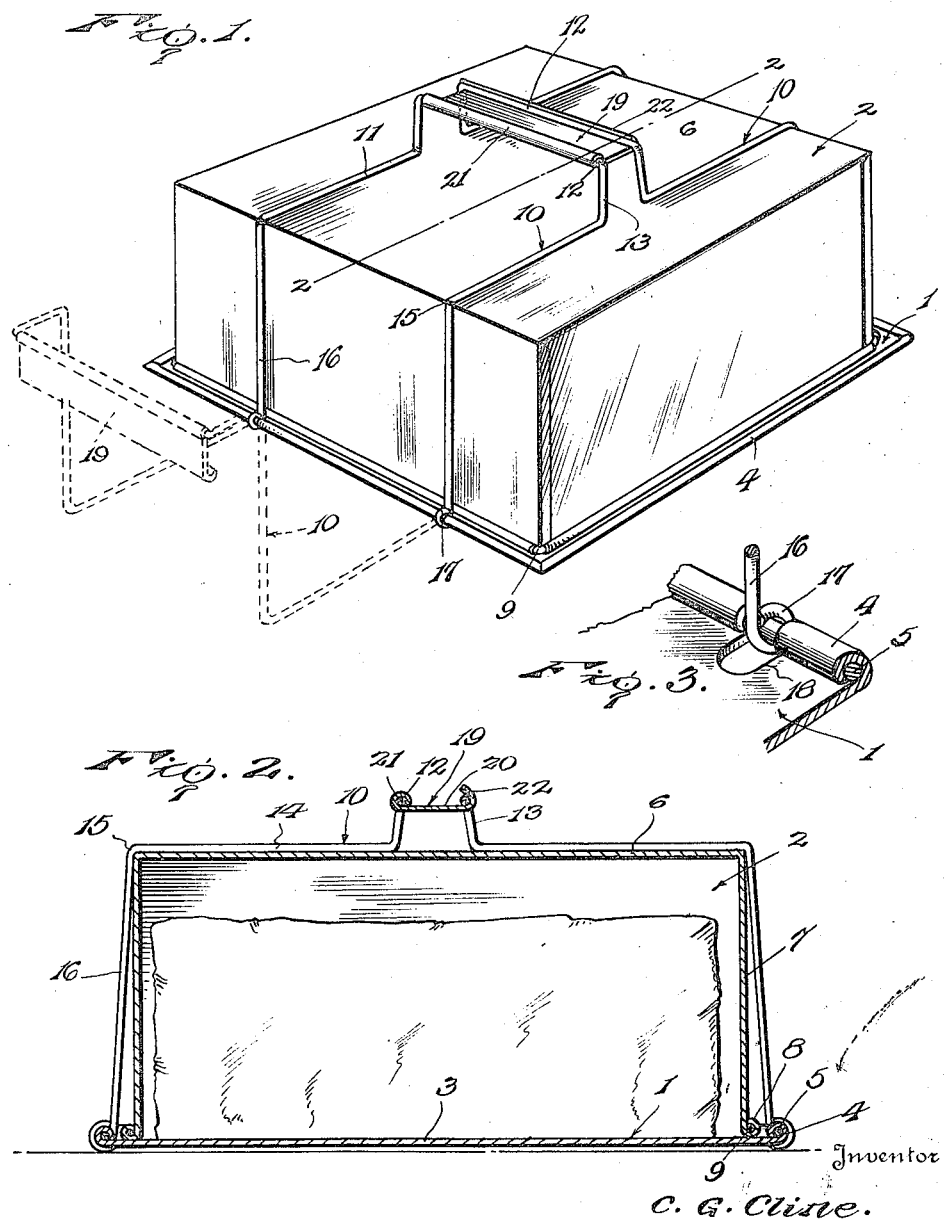

Patented May 27, 1924.

1,495,548

UNITED STATES PATENT OFFICE.

CHARLES G. CLINE, OF LEON, IOWA, ASSIGNOR TO ADELAIDE L. CURRY, OF LEON, IOWA.

CONTAINER.

Application filed August 1, 1922. Serial No. 579,012.

*To all whom it may concern:*

Be it known that I, CHARLES G. CLINE, a citizen of the United States, residing at Leon, in the county of Decatur and State of Iowa, have invented certain new and useful Improvements in Containers, of which the following is a specification.

My invention relates to improvements in portable containers and more particularly to an improved box for containing cake, the primary object of the invention being to provide a box in which the cake may be placed immediately after its removal from the oven and before the icing has been applied thereto and in which box the cake may be permitted to remain until consumed, the box being so constructed as to effectually protect the cake from the drying effect of the atmosphere and also protect it from insects or rodents.

Another important object of the invention is to so construct the box that when the same is opened, the cake will be completely exposed so that any desired portion may be cut therefrom in a convenient manner and without the necessity of lifting the cake from the box with the liability of crumbling it.

Another important object of the invention is to provide a cake box which may be employed under practically all conditions, that is to say either within the home or on picnics, automobile trips, as a portable carrier, or as a container for parcel post shipment.

Generally speaking, the box or container embodying the invention comprises a relatively flat bottom or base, and a hollow body which constitutes a cover and enclosure for the cake disposed upon the said bottom or base, and another object of the invention is to provide a novel arrangement of carrier handle adapted to serve also as a means for retaining the body or cover of the container in closed position and against displacement with relation to the base, and at the same time capable of convenient manipulation to render it inactive to serve this purpose and at such time permit of the said body or cover being readily lifted from the base so as to expose the cake.

In the accompanying drawings:

Figure 1 is a perspective view of the container embodying the invention, the body or cover of the container being in place and the handle members being shown in retaining or active position in full lines and one being shown in dotted lines in outwardly swung or inactive position;

Fig. 2 is a vertical sectional view on the line 2—2 of Fig. 1;

Fig. 3 is a fragmentary perspective view illustrating the manner of swingingly mounting the handle members of the container.

In the drawings the base or bottom of the container is indicated in general by the numeral 1, and the body or cover of the container is indicated in general by the numeral 2. The base 1, as well as the body or cover 2, is preferably formed of sheet metal and the said base comprises a flat plate-like body 3 having its marginal portions rolled to provide marginal beads 4 extending about the said body and enclosing a wire frame 5 which will presently be more specifically referred to. In the drawings the bottom or base 1, as well as the body or cover 2, is illustrated as of rectangular form, but it will be understood that these parts may be given any other desired contour without departing from the spirit of the invention; also they may be of any desired dimensions.

The body or cover 2 comprises a top 6 and side walls 7 which depend from the top at the margins thereof and preferably have their lower edge portions reinforced by being rolled as at 8 about a wire frame 9 disposed to surround the lower part of the said body or cover 2. At its bottom, the body or cover 2 is preferably of substantially the same marginal contour as the bottom or base 1 but of slightly less dimensions so that in assembling the parts, the hollow body or cover 2 may be disposed to rest at its lower side upon the upper side of the base or bottom 1 and be retained by the bead 4 against lateral displacement. When the parts are so assembled, a cake disposed upon the bottom or base 1 will be completely housed within the hollow body or cover 2 and thus effectually protected both from the atmosphere and from insects and rodents. Inasmuch as the bead 4 does not project any considerable distance above the plane of the bottom or base 1, it will be evident that when the cover or body 2 is removed, the cake will be exposed in such a manner as to permit of portions being cut therefrom with the same facility as though the cake were disposed upon an ordinary plate. Also in view of the form given the parts 1 and 2, there is no necessity for actually handling the cake in cutting slices therefrom.

In order that the container may be conveniently carried about from place to place and also in order to retain the cover or body 2 firmly in position upon the base or bottom 1, means is provided which will now be described. The means referred to comprises a pair of counterpart handle members each indicated in general by the numeral 10, and each of these members is preferably formed from a single length of wire bent to provide spaced side members 11 and a connecting cross member 12. Adjacent the cross member 12, the side members 11 are bent so as to provide upstanding portions 13 which position the cross member 12 in spaced relation above the top 6 of the body 2, and other portions 14 which extend across the said top 6, and in one position of adjustment of the members 10, in firm contact with the said top. The side members 11 are also bent at an intermediate point as indicated by the numeral 15 so as to provide portions 16 which extend downwardly beside the respective side wall 7 of the body or cover 2 and which at their lower ends are bent to form pivot eyes 17 which pivotally engage the wire frame 5, the bottom or base 1 being cut away or recessed as at 18 at suitable points so as to accommodate the said eyes 17. In this manner the handle members 10 are connected swingingly with the base or bottom 1 at opposite sides thereof and they may be swung to the full line position shown in Figs. 1 and 2 of the drawings, in which position their portions 14 will extend across the upper side of the top 6 of the body or cover 2 and in firm engagement therewith and their portions 16 downwardly beside the opposite sides of said body or cover. Also when desired the said handle members 10 may be swung outwardly as represented in dotted lines in Fig. 1 of the drawings so as to be in position clear of the body or cover 2 and permit of the removal thereof from the base 1. In order to lock and retain the handle members 10 in active position or in other words in the position shown in full lines in Figs. 1 and 2, a grip member indicated in general by the numeral 19 is provided and comprises a plate or strip 20 which has one of its longitudinal edge portions rolled upon itself as at 21 to pivotally embrace the cross member 12 of one of the handle members 10. The other longitudinal marginal portion of the plate or strip 20 is bent upwardly and backwardly to provide a lip 22 substantially hooked shape in cross section and adapted for engagement with the cross member 12 of the other handle member as most clearly shown in the said Figs. 1 and 2. Of course, when the lip 22 is engaged with the last-mentioned handle member, the two handle members will be securely retained in firm engagement with the cover or body 2 of the container and the body will be securely held against displacement. Also under these conditions the member 19 serves as a handle or hand grip member by which the container may be conveniently carried. When it is desired to release the handle members 10 for the purpose of swinging them outwardly from engagement with the body 2, it is only necessary to first disengage the lip 22 from the cross piece of the handle member with which it has previously been engaged.

Having thus described the invention, what is claimed as new is:

1. A container comprising a substantially plane bottom, an inverted cover removably disposed upon the said bottom, handle members swingingly connected with the bottom and adapted to engage over the cover and terminating short of each other in parallel upstanding portions, and a hand grip member pivotally connected with the upstanding terminal of one handle member and adapted to have latching engagement with the terminal of the other handle member and bridge the space between the terminals.

2. A container comprising a substantially plane bottom, a member constituting the body and cover of the container removably disposed thereon to enclose that which may be disposed and supported upon the said bottom, the bottom comprising a plate-like body having its marginal portions overturned upon themselves and a frame enclosed by said portions, the said body being cut away at spaced points at opposite sides, and handle members having spaced portions terminally pivotally engaging the frame at the cut away portions of the bottom and engageable over the top of the body and cover member to retain the same in place.

3. A container comprising a substantially plane bottom, a member constituting the body and cover of the container removably disposed thereon to enclose that which may be disposed and supported upon the said bottom, the bottom comprising a plate-like body having its marginal portions overturned upon themselves and a frame enclosed by said portions, the said body being cut away at spaced points at opposite sides, handle members having spaced portions terminally pivotally engaging the frame at the cut away portions of the bottom and engageable over the top of the body and cover member to retain the same in place, and a grip member pivotally connected with one of said handle members and adapted for latching engagement with the other handle member.

In testimony whereof I affix my signature.

CHARLES G. CLINE. [L. S.]